May 16, 1967
J. Z. DE LOREAN
3,319,598
TRANSMISSION CONTROL INDICATOR
Filed Oct. 20, 1964
2 Sheets-Sheet 2
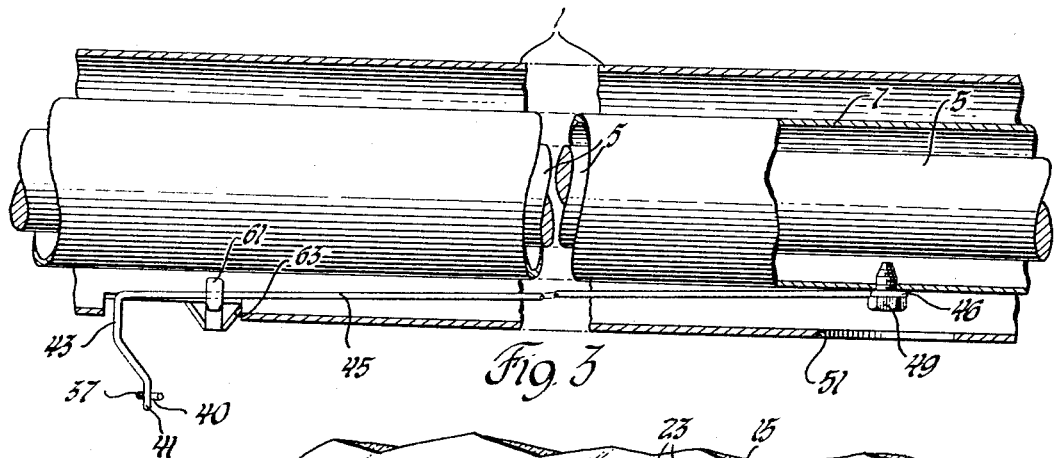
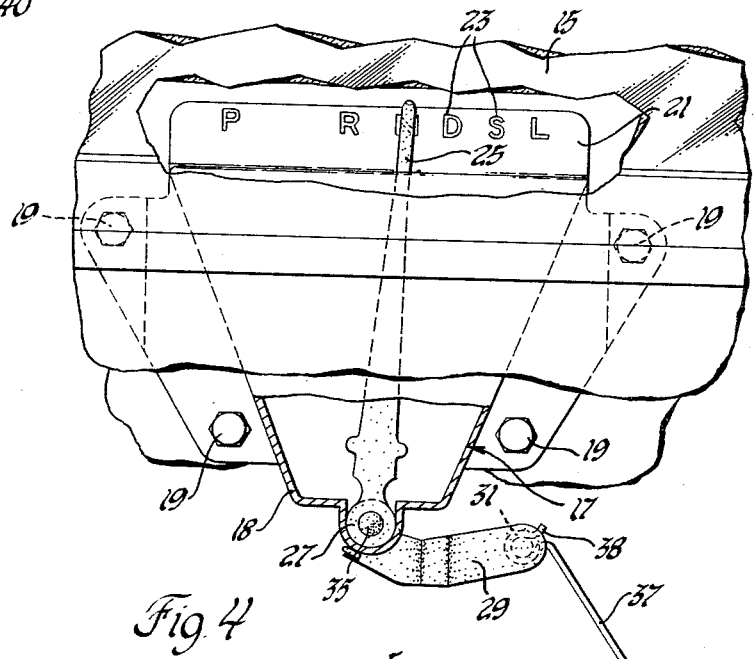
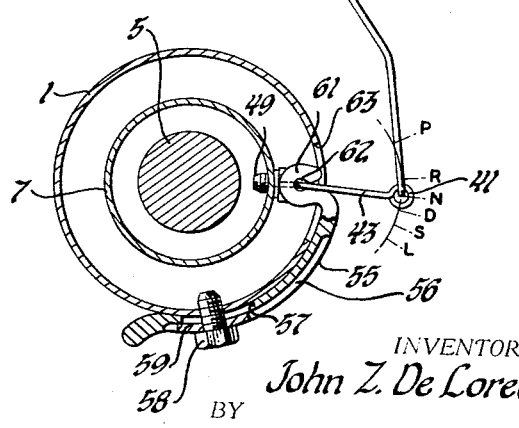
INVENTOR.
John Z. De Lorean
BY a. m. heiter
ATTORNEY

United States Patent Office 3,319,598
Patented May 16, 1967

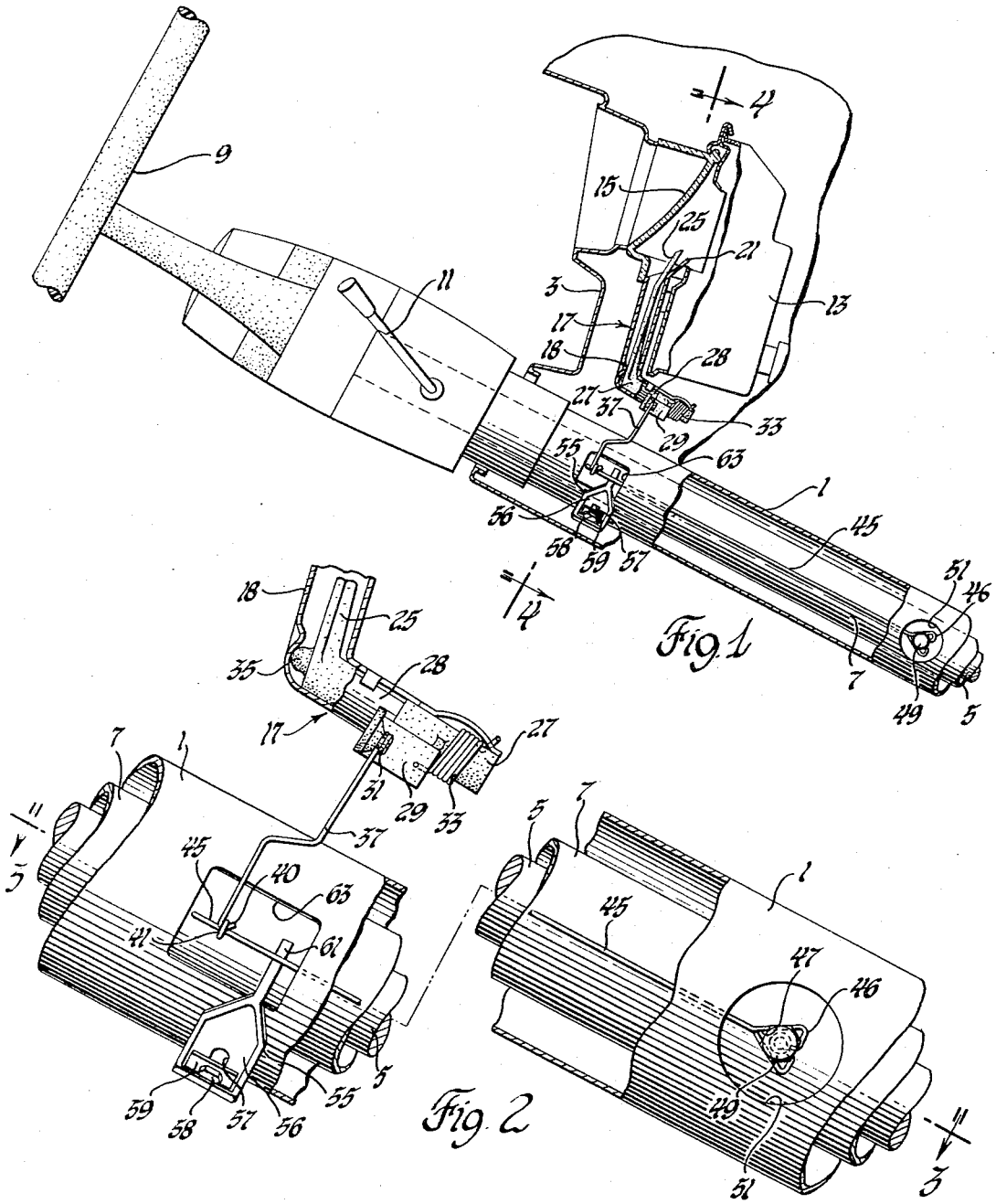

3,319,598
TRANSMISSION CONTROL INDICATOR
John Z. De Lorean, Birmingham, Mich., assignor to General Motors Corporation, Detroit, Mich., a corporation of Delaware
Filed Oct. 20, 1964, Ser. No. 405,128
6 Claims. (Cl. 116—124)

This invention relates generally to indicators and more particularly to vehicle transmission control indicators.

In modern vehicle design it is generally desirable to group the instruments and gauges pertaining to vehicle operation in an instrument cluster in the instrument panel so that the vehicle operator may quickly observe and respond to the readings of the various instruments. Thus it is often desirable to mount a dial and cooperating pointer of a transmission control indicator in the instrument panel as part of the instrument cluster and mount the transmission operating mechanism, which also operates the indicator, on the steering column of the vehicle chassis. However, the efficient and accurate connection of the operating mechanism to the indicator pointer or dial and subsequent adjustment, if necessary, is frequently a tedious, time-consuming and expensive assembly operation.

The transmission control indicator of this invention includes an improved linkage for operatively coupling a shifter tube to a shift position or drive range pointer or dial. This linkage enables the pointer or dial to be located with the cluster of implements to facilitate observation and facilitates vehicle assembly by improving the connection of the position indicator and the shifter tube. The linkage of this invention includes a torsion bar having a lower end portion secured to the shifter tube and a laterally extending upper end portion coupled directly to or through linkage members to a pointer movable across a suitable scale. The torsion bar is restrained from rotation with the shifter tube by a fixed support member intermediate the end portions and will twist on shifter tube rotation. Torsion bar twisting is reflected in a turning motion of the upper end portion. The pointer responds to movement of the upper end portion by indicating a change in the drive range. The ratio of the travel of the upper end portion to the travel of the shifter tube is controlled by selection of the length of the upper end portion. Compensation for misalignment between the indicator and the shifter tube can be accomplished by changing the dimensions of the linkage connecting the upper end portion of the torsion bar and the pointer.

It is an object of this invention to provide a new and improved indicator which includes an elongated torsion bar attached at one end to a rotatable member and mounted near the other end in a stabilized support member to actuate an indicator member.

Another object of this invention is to provide a new and improved transmission control indicator which is responsive to transmission shift-tube motion to accurately indicate the operating condition of a transmission.

Another object of this invention is to provide a transmission control indicator which incorporates few parts and were requires a minimum amount of space in the instrument panel area.

Another object of this invention is to provide a new and improved transmission control indicator which includes a torsion bar and torsion bar actuated linkage connecting transmission control means to a pointer member.

The foregoing and other objects and advantages of this invention will be apparent from the detailed description which follows and the accompanying drawings in which:

FIGURE 1 is a side view of a steering column in relation to a vehicle instrument panel;

FIGURE 2 is an enlarged view of a portion of FIG. 1 with parts broken away;

FIGURE 3 is a view taken generally along the line 3—3 of FIG. 2, looking in the direction of the arrows, and FIGURE 4 is a view taken along line 4—4 of FIGURE 1.

Referring to the drawing and particularly to FIG. 1, there is shown a cylindrical vehicle steering column, or mast jacket 1 of a vehicle chassis as assembled with an instrument panel 3 of a vehicle body. A steering shaft 5 is rotatably mounted within this jacket for the purposes of steering the vehicle. This steering shaft is surrounded by a hollow transmission control shift tube 7 which is also rotatably disposed within the mast jacket about an axis of rotation for the purpose of selecting transmission drives or locking the transmission for parking. As shown, the steering shaft has a conventional steering wheel 9 attached to the upper end thereof for turning the front wheels and thereby guiding the vehicle, while the upper end of the transmission control shift tube is secured in a conventional manner to a transmission shift lever 11 so that upon appropriate rotational movement of the lever, the shift tube 7 will be rotated to condition the vehicle transmission for forward drive, reverse, neutral or park, whichever may be desired. Mounted within the instrument panel in any suitable manner is a housing 13 which contains an instrument cluster, such as the speedometer and other gauges.

The housing 13 includes a transparent window 15 to protect the gauges and instruments and through which the operator may observe the instruments. A suitable lighting means, not shown, may be provided within the housing to illuminate the interior of the housing and the instruments and gauges contained therein.

The instrument cluster in the present invention includes a transmission control indicator assembly 17 having an indicator housing 18. This housing is secured to instrument housing 13 by suitable fasteners 19 and is within the confines of the instrument housing. The indicator assembly includes dial portion 21 having legends 23 which indicate Park and the various transmission drives which may be utilized in vehicle operation. Also mounted within the indicator assembly housing is a rotatable elongated pointer 25 which cooperates with the legends 23 to indicate transmission status or condition. Pointer 25 is formed with an integral cylindrical pivot shaft 27 which is rotatably mounted in a lower laterally-extending portion 28 of the housing 18. As illustrated best by FIGURE 2, the pivot shaft extends out of the end of portion 28 and is formed with a lever arm 29 integral therewith. This lever arm projects generally at right angles to the pivot shaft and has near one end a projecting headed pivot stud 31. A coil spring 33 is mounted on the end of the cylindrical pivot shaft 27 behind the arm 29 and has one end anchored to the arm 29 and the other end anchored on housing 18. This spring forces the bearing 35 formed on the end of the cylindrical shaft 27 into contact with the front wall of the housing to center the pointer in the housing. This spring also biases the pointer toward the PARK position (P) on the dial 21, exerting a counterclockwise force on the linkage and torsion bar, described below, which operatively connects pointer 25 to the shift tube 7. The linkage system includes lever arm 29 which when appropriately rotated will rotate the pivot shaft and sweep the pointer across the dial. This lever arm is rotated by an elongated link member 37 which has one end pivotally connected to the pivot stud by a hook 38. The other end of the link is formed with a downwardly-extending, projecting portion 40 which extends through an eye 41 of a generally radially-extending arm 43 formed on one end of an elongated, resilient torsion bar 45. It will be appreciated that spring 33 exerts a counterclockwise force on arm 29 to take up any looseness in the linkage connecting the pointer and torsion bar. As best illustrated in FIGS. 2 and 3, the torsion bar extends generally axially along the periphery of the transmission shift tube and between the shift tube and mast jacket. The lower end of the torsion bar is in the form of a spring clip 46 having opposed resilient jaws which cooperate to form an opening 47 for the reception of the shank of screw 49.

This screw mounts the lower end of the bar to tube 7 at a point transversely spaced from the axis of tube 7. When not tightened, screw 49 permits limited rotation of the torsion bar about the axis of the screw when the tube 7 is turned and does not restrain movement of tube 7. However, if desired this screw may be tightened to rigidly secure one end of torsion bar 45 to the rotatable shift tube 7 to prevent any relative rotation during rotation of the shift tube. In either case rotation of the shift tube will twist the torsion bar and rotate arm 43. A suitable opening 51 is provided in the mast jacket to provide access to the screw 49 and the end of the torsion bar for assembly or repair purposes. The upper end portion of the torsion bar is held by an arcuate retainer 55 provided with an elongated indented recess 56 and slot 57 which extends longitudinally of the retainer. This retainer is slidably mounted on the mast jacket by a screw 58 which extends through slot 57 and a washer 59 which rides in recess 56. By loosening screw 58, the retainer can be adjusted circumferentially on the mast jacket within the limits allowed by slot 57.

As shown best by FIG. 4, the retainer is formed at one end with an inwardly extending tab portion 61 which projects through an opening 63 provided in the mast jacket. This tab portion has an eye 62 which receives and supports the upper end of the torsion bar and its laterally-extending arm 43. Thus, when the tube 7 is turned the lower end of the torsion bar will turn with tube 7. The upper end of the torsion bar will be restrained from such movement by eye 62 and the torsion bar will twist or turn about its own longitudinal axis. The laterally-extending arm portion 43 will be deflected to actuate the link 37, lever arm 29 and attached pointer 25. As illustrated in FIG. 3, the eye 62 is located at a predetermined axial distance from the connection between the torsion bar and the shift tube to prevent any unnecessary binding in the eye when the lower end of the torsion bar is rotated by the shift tube. Then the arm portion 43 will rotate substantially the same number of radians as the tube 7. The eye 62 is preferably located quite close to the periphery of the shift tube 7 to provide a small included angle between the torsion bar and the shift tube. This minimizes the tendency of the bar to slide axially in the eye 62 when the shift tube is rotated.

The torsion bar arm portion 43 which extends generally at right angles from the body of torsion bar 45 through the opening 63 may be of various lengths. Preferably, its length is equal to the radius of arc through which the lower end of the torsion bar swings when the shift tube is rotated. This will result in a relationship between the travel of the shift tube and the upper eye 41 of the torsion bar arm portion of about 1:1 ratio. When the shift lever 11 is rotated the lower end of the torsion bar 45 will describe an arc substantially equal to the amount of rotation of the shift tube 7. The torsion bar arm portion 43 will then be turned and eye 41 will move in an arc equal to the arc made by the turning shift tube. This turning motion will be transferred through the link member 37 and the lever arm 29 to rotate the pointer 25 around the axis of the cylindrical pivot shaft 27. The pointer 25 will accordingly indicate rotational movement of the transmission shift lever on dial 21.

It will be appreciated that a movable dial which cooperates with a fixed pointer could be readily connected directly with the torsion bar arm 43 to record movement of the shift tube 7. Furthermore, arm 43, itself, may be utilized as a pointer to indicate transmission conditions on an appropriately located dial.

With the preferred structure of the present invention, the initial assembly of the linkage system to the steering column is facilitated since the end of the torsion bar may be inserted through the opening 63 in the mast jacket. The jaws of the spring clip are then forced apart so that opening 47 receives the shank of the screw 49. The upper portion of the torsion bar can be adjusted relative to the mast jacket 1 by adjusting retainer 55 and then tightening screw 58. When the vehicle body is joined to the chassis, the link 37 can be fastened to the pivot stud 31 of lever arm 29. At this point it can be determined if adjustment of the linkage system is necessary in order that the pointer accurately indicates the drive condition of the transmission. If adjustment is required, it can simply be made by loosening the screw 58 and appropriately shifting retainer 55 to adjust the torsion bar arm pivot formed by the eye 62 to change the pointer position to the appropriate legend.

Calibration of the pointer travel to compensate for assembly center-to-center distance variation between the vehicle body and chassis can be accomplished by selection of the proper length of link member 37.

From the foregoing, it will be understood that the present invention involves a transmission control indicator which can be conveniently placed in the visual plane normally covered by the operator when reference is made to the instrument cluster and which involves few parts and facilitates vehicle assembly operations. It will be appreciated that the transmission control indicator of the present invention may be repaired or replaced with great ease and low costs.

It will be apparent to those skilled in the art that certain changes may be made to the embodiment as described but which incorporate the same principle of operation, and it is to be understood that the invention is not to be limited by the above description but only by the following claims.

I claim:

1. In a position indicator, support means, a rotatable member mounted on said support means for rotation substantially about an axis, operating means operatively connected to said member for rotating said member, a bar extending generally longitudinally with respect to said axis, means securing one point of said bar to said rotatable member at a point transversely spaced from the axis of said member for bodily movement with said rotatable member to impart a turning movement to said bar substantially about its own longitudinal axis, retainer means mounted on said support means receiving another point of said bar longitudinally spaced from said one point and restraining said another point from bodily rotation with said member while permitting rotation of said bar about its own longitudinal axis, indicator means operatively connected to a portion of said bar longitudinally spaced from said one point to indicate the relative rotary position of said member, said bar being turned on its own longitudinal axis to operate said indicator means when said one point is bodily turned with said member in response to rotation of said member and said another point is simultaneously restrained from bodily rotation with said member.

2. In a position indicator, support means, a rotatable member mounted on said support means for rotation substantially about an axis, operating means operatively connected to said member for rotating said member, a bar extending generally longitudinally with respect to said axis, means securing one point of said bar to said rotatable member at a point transversely spaced from the axis of said member for bodily movement with said rotatable member to impart a turning movement to said bar about its own longitudinal axis, retainer means mounted on said support means receiving another point of said bar longitudinally spaced from said one point and restraining said another point from bodily rotation with said member while permitting rotation of said bar about its own longitudinal axis, indicator means extending from said bar longitudinally spaced from said one point to indicate the relative rotary position of said member, said bar turning to operate said indicator means in response to rotation of said rotatable member turning said one point of said bar while said restraining means restrains said another point of said bar from bodily rotation with said member.

3. In a position indicator, support means, a rotatable member mounted on said support means for rotation substantially about an axis, operating means operatively connected to said member for rotating said member, a bar extending generally longitudinally with respect to said axis, mounting means for said bar including means securing one point of said bar to said rotatable member for bodily movement with said rotatable member to impart a turning movement to said bar substantially about its own longitudinal axis and retainer means mounted on said support means receiving another point of said bar longitudinally spaced from said one portion and restraining said another point from bodily rotation with said member while permitting rotation of said bar substantially about its own longitudinal axis for torsional deflection of said bar, and indicator means operatively connected to a point of said bar longitudinally spaced from said one point responsive to turning of said bar to indicate the relative rotary position of said member.

4. In a transmission control indicator, a transmission control rotatable with respect to an axis, operating means operatively connected to said control for turning said control, a support, a bar extending generally longitudinal with respect to said axis, mounting means for said bar including means securing one point of said bar to said rotatable control for bodily movement with said rotatable control to impart a turning movement to said bar substantially about its own longtiudinal axis and retainer means mounted on said support receiving another point of said bar longitudinally spaced from said one point and restraining said another point from bodily rotation with said control while permitting the torsional deflection and turning said bar with respect to its own longitudinal axis, and indicating means operatively connected to a point of said bar longitudinally spaced from said one point responsive to turning of said bar to indicate relative rotary position of said member.

5. In a transmission control indicator, a transmission control member rotatable about an axis, operating means operatively connected to said member for turning said member, a bar extending generally longitudinally with respect to said axis, means securing one point of said bar to said rotatable member at a point transversely spaced from the axis of said member for movement with respect to said rotatable member to impart a turning movement to said bar about its own longitudinal axis, a support, retainer means mounted on said support receiving another point of said bar longitudinally spaced from said one point and restraining said another point from bodily rotation with said member while permitting rotation of said bar about its own longitudinal axis, indicator means operatively connected to a point of said bar longitudinally spaced from said one point to indicate the relative rotary position of said member, said bar being responsive to rotation of said rotatable member which turns said one point of said bar as said restraining means restrains said another point of said bar by turning to operate said indicator means.

6. In a transmission control indicator for a vehicle transmission, a steering column, a transmission control member rotatably mounted with respect to said steering column about a longitudinal axis, operating means operatively connected to said member for rotating said member, a bar extending longitudinally with respect to said axis, means securing one point of said bar to said rotatable member at a point transversely spaced from the axis of said member for bodily movement with said rotatable member to impart a turning movement to said bar substantially about its own longitudinal axis, retainer means mounted on said steering column receiving another point of said bar longitudinally spaced from said one point for restraining said another point from bodily rotation with said member while permitting rotation of said bar about its own longitudinal axis, indicator means operatively connected to a portion of said bar longitudinally spaced from said one point to indicate the relative rotary position of said member, said bar operating in response to the turning of said one point of said bar by operation of said rotatable member and the restraining of said another point of said bar by said restraining means by turning on its own axis to rotate said indicator means.

References Cited by the Examiner

UNITED STATES PATENTS

| | | | |
|---|---|---|---|
| 2,671,425 | 3/1954 | Schneider | 116—124 |
| 2,732,905 | 1/1956 | Anderson et al. | 180—90 |
| 2,737,147 | 3/1956 | Bliss | 116—124 |
| 2,869,506 | 1/1959 | Grady | 116—124 |
| 2,925,061 | 2/1960 | Thornburgh | 116—124 |
| 3,084,659 | 4/1963 | Griffen | 116—124 |

LOUIS J. CAPOZI, *Primary Examiner.*